United States Patent [19]

Baumann

[11] Patent Number: 5,305,603
[45] Date of Patent: Apr. 26, 1994

[54] EXHAUST GAS DUCT FOR A ROW OF CYLINDERS OF AN INTERNAL COMBUSTION ENGINE

[75] Inventor: Hermann Baumann, Tettnang, Fed. Rep. of Germany

[73] Assignee: Mtu Motoren- Turbinen-Union Friedrichshafen GmbH, Friedrichshafen, Fed. Rep. of Germany

[21] Appl. No.: 21,166

[22] Filed: Feb. 22, 1993

[30] Foreign Application Priority Data

Feb. 28, 1992 [DE] Fed. Rep. of Germany ....... 4206249

[51] Int. Cl.⁵ ............................................. F01N 7/10
[52] U.S. Cl. ........................................ 60/321; 60/322; 60/323
[58] Field of Search .......................... 60/321, 322, 323

[56] References Cited

U.S. PATENT DOCUMENTS 2,125,703  8/1938  Williams .
3,653,205  4/1972  Tadokoro ............................ 60/322
4,179,884  12/1979  Koeslin ................................ 60/321
4,463,709  8/1984  Plueguet .............................. 60/321
4,658,580  4/1987  Schley ................................. 60/322

Primary Examiner—Douglas Hart
Attorney, Agent, or Firm—W. G. Fasse; W. F. Fasse

[57] ABSTRACT

An exhaust gas duct for a row of cylinders of an internal combustion engine is so constructed that corrosion, especially fretting corrosion, is minimized by mounting the exhaust gas pipe section in a cooling housing so that contact between the pipe section and the cooling housing is limited to the end portions of the exhaust gas pipe section, thereby leaving an uninterrupted gap between the pipe section and the housing all along the pipe section. The end mountings permit an axial movement, and, if desired, also a radial movement of the pipe section relative to the liquid cooled housing for compensating thermal expansions and contractions. The end mountings are easily accessible for inspection and additionally, permit an easy assembly and disassembly of the components.

13 Claims, 3 Drawing Sheets

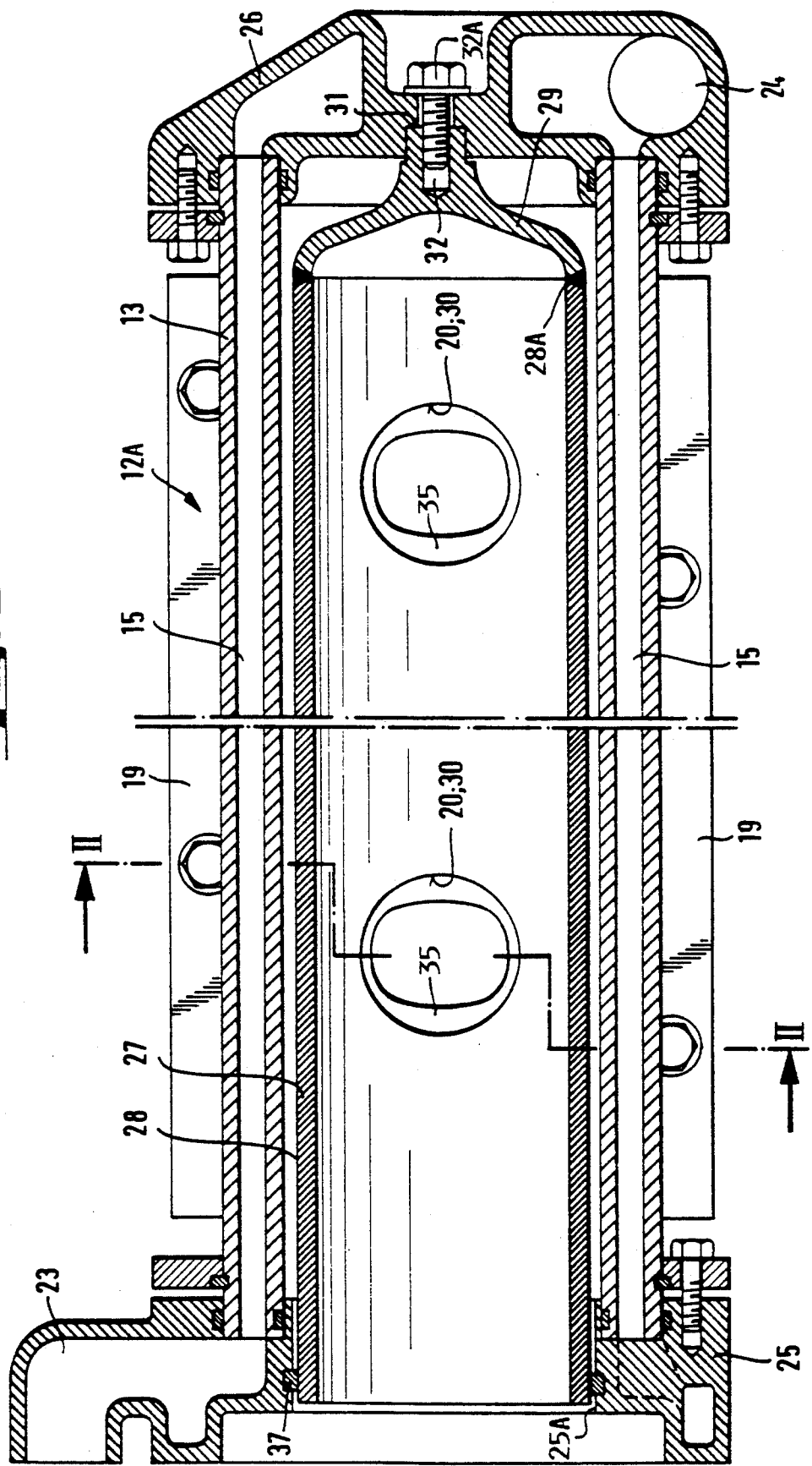

EXHAUST GAS DUCT FOR A ROW OF CYLINDERS OF AN INTERNAL COMBUSTION ENGINE

CROSS-REFERENCE TO RELATED APPLICATION

The present invention relates to my copending application U.S. Ser. No. 08/021,162; filed on Feb. 22, 1993, entitled: EXHAUST GAS DUCT FOR A ROW OF CYLINDERS OF AN INTERNAL COMBUSTION ENGINE.

FIELD OF THE INVENTION

The invention relates to an exhaust gas duct for a row of cylinders of an internal combustion engine. The duct includes an exhaust pipe section mounted in a cooling housing with a gap between the housing and the exhaust pipe section for air or gas insulating the pipe section from the cooling housing.

BACKGROUND INFORMATION

Due to the above mentioned insulating gap between the exhaust gas pipe section and the cooling housing, the cooling housing does not withdraw much heat from the exhaust gas which is desirable because it is thus possible to supply the exhaust gas at a higher energy potential to a super-charger. However, it is necessary that the exhaust gas pipe section is surrounded by a housing that keeps its temperature within the range of the temperature of the cooling liquid of the internal combustion engine in order to satisfy operation requirements for engines that are intended to run without monitoring.

U.S. Pat. No. 2,125,703 (J.G. Williams), issued on Aug. 2, 1938, discloses an exhaust gas duct in which the exhaust gas pipe section is directly centered at the outer diameter of both pipe ends in the housing of the duct. A radial pin is provided for fixing the exhaust gas pipe section in the axial direction. The radial pin passes through the housing, as well as through the wall of the exhaust gas pipe section. Additionally, the exhaust gas pipe section is supported locally at the edge of each of the entrance passages or openings for the exhaust gas into the pipe section. This type of construction results in fretting corrosion at the points of contact between the components of the duct, due to the substantial heat expansion differences that occur during operation between the housing and the pipe section. These heat expansion differences cannot be avoided, due to the large temperature differences between the pipe section that is directly in contact with the exhaust gas and the housing components that are liquid cooled.

Such fretting corrosions may become the cause for structural changes of the components that are in frictional contact with each other and such changes may in turn become danger points which impair the further operation of the internal combustion engine. This danger is particularly undesirable because the points where the fretting corrosion may occur are not easily accessible, and hence not easily detectable when inspections are made.

OBJECTS OF THE INVENTION

In view of the foregoing it is the aim of the invention to achieve the following objects singly or in combination:

to construct an exhaust gas duct for a row of cylinders in an internal combustion engine in such a way that contacts between the water cooled housing and the exhaust gas pipe section in contact with the exhaust gas are avoided or at least minimized to the end portions of the pipe section;

to mount the exhaust gas pipe section in the water cooled housing in such a manner that the mounting elements are positioned in areas which are not critical, namely where the temperature differences are naturally smaller and where an inspection is easily possible; and to mount the exhaust gas pipe section in the water cooled housing in such a manner that the exhaust gas pipe section is able to move axially to compensate for thermal expansions and contractions, and preferably also radially.

SUMMARY OF THE INVENTION

The exhaust gas duct according to the invention is characterized in that the cross-section of the exhaust gas channel or pipe section is closed at one end and the entire exhaust gas pipe section is self-supporting between its ends, whereby one pipe section end is mounted to one housing end section while the other end of the pipe section is mounted to the respective other housing end section, one of which forms a closure cover and the other of which forms a mounting ring and cover, and wherein the mountings permit an axial compensation movement of the exhaust gas pipe section relative to the cooling housing in response to thermal expansions and contractions of the exhaust gas pipe section, preferably a radial compensation movement is also possible.

The advantages achieved according to the invention reside in the fact that the exhaust gas pipe section which forms a guide channel for the exhaust gas and the housing end sections can be easily assembled and disassembled even after prolonged periods of operation, whereby the flange mounting at one end of the pipe section and the guide pin mounting at the other end of the pipe section in the respective housing end sections are accessible for inspection for signs of fretting corrosion during maintenance work. The assembly of the exhaust gas pipe section and of the three cooling housing sections is also very simple and the cooling housing sections are substantially protected against contact by exhaust gas.

BRIEF DESCRIPTION OF THE DRAWINGS

In order that the invention may be clearly understood, it will now be described by way of example, with reference to the accompanying drawings, wherein:

FIG. 3 is a view similar to that of FIG. 1, however showing a modified mounting of the exhaust gas pipe section in the cooling housing.

DETAILED DESCRIPTION OF PREFERRED EXAMPLE EMBODIMENTS AND OF THE BEST MODE OF THE INVENTION

Figure 1:
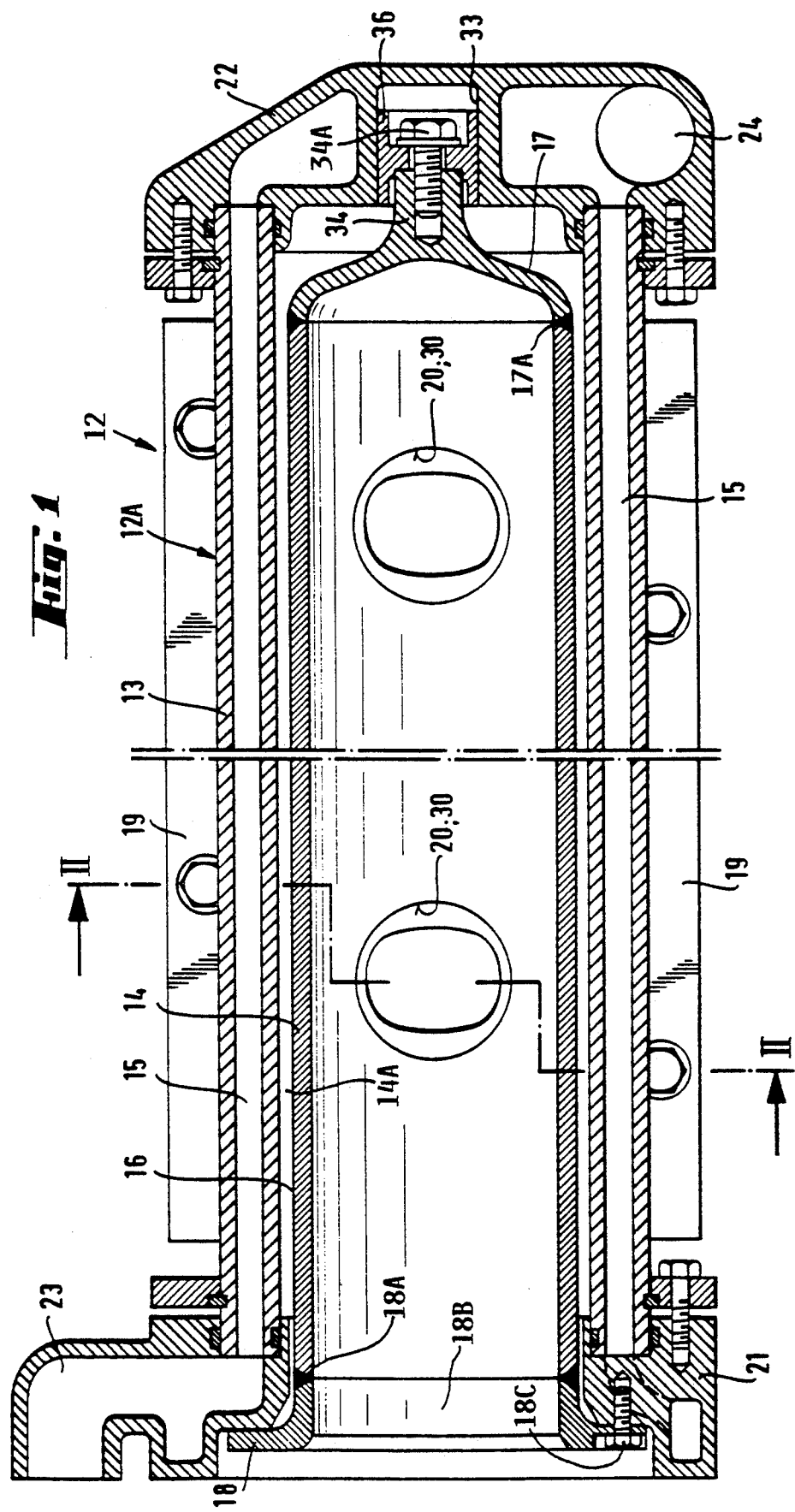
FIG. 1 is a longitudinal section through a first embodiment according to the invention along section line I—I in FIG. 2, and showing a cooling housing having three main components enclosing with a gap the exhaust gas pipe section.
Figure 2:
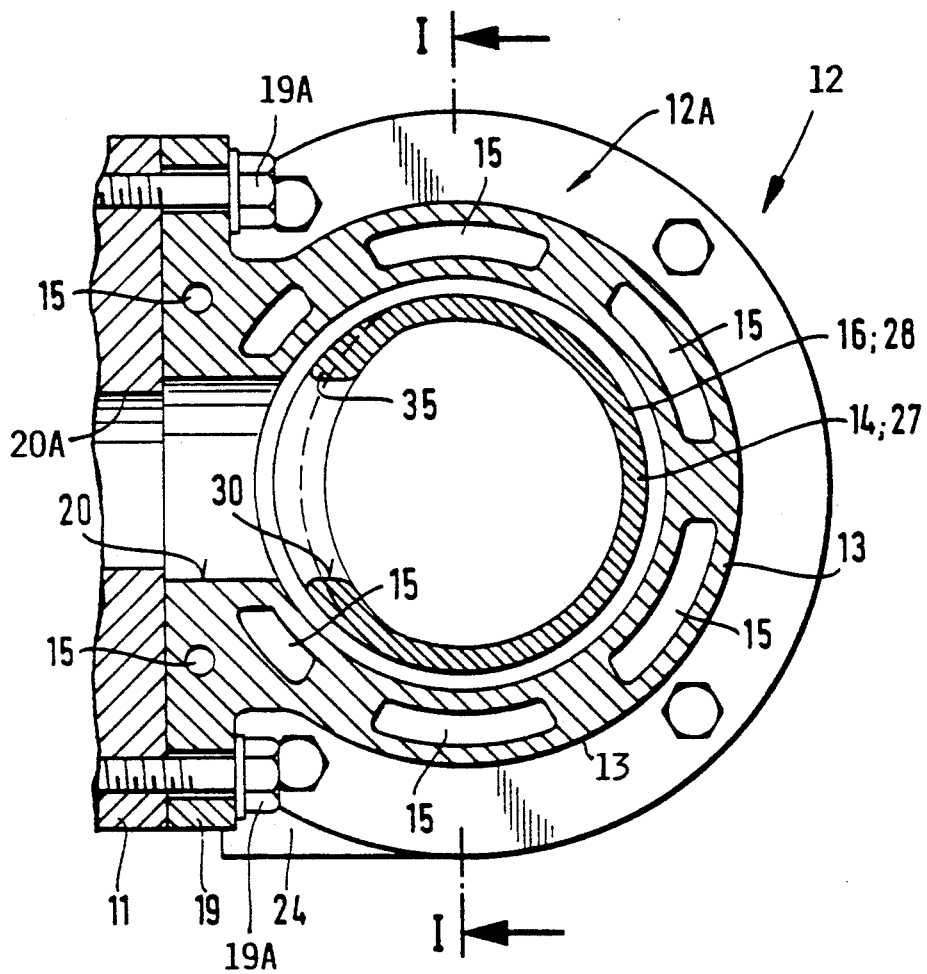
FIG. 2 is a sectional view along section line II—II in FIG. 1.

Referring to FIGS. 1 and 2 in conjunction, the present exhaust gas duct 12 comprises a cooling housing 12A that extends along a row of cylinders in a cylinder head 11 of an internal combustion engine. Only the exhaust ports 20A of the cylinders are shown in FIG. 2. The duct further comprises an exhaust pipe section 14 which forms an exhaust gas guide channel. The exhaust gas pipe section 14 comprises a single piece central portion 16 that extends along the row of cylinders and two end portions 17 and 18. The end portion 17 closes the right-hand end of the central portion 16 and is welded to the central portion by a welding seam 17A. The left-hand end of the pipe section 14 is formed by a flanged ring 18 welded to the single piece central portion 16 by a welding seam 18A, thereby forming an exit opening 18B leading into a further pipe not shown for supplying the exhaust gas into a super-charger, for example. The cooling housing 12A also has a central or middle section 13 extending alongside the cylinder block 11 and two end sections 21 and 22. The housing section 13 surrounds the pipe section 16 with an insulating gap 14A forming a dead space holding gas in operation. The housing section 13 and the pipe portion 16 are uninterrupted along the length of the cylinder block, except for exhaust gas passages 20, 30 to be described below.

As shown in FIG. 2, the housing section 13 of the duct 12 has a substantially circular cross-section and comprises a plurality of longitudinal cooling liquid chambers 15 which on the left-hand side of FIG. 2, are vertically spaced from each other to provide room for an exhaust gas flow passage 20. The chambers 15 communicate at their ends with each other through respective ducts in the end sections 21 and 22, which are connected to a cooling liquid circulating circuit through ports 23 and 24 respectively. A mounting flange portion 19 extends alongside the central housing section 13 approximately tangentially thereto. The flange portion 19 is somewhat shorter than the housing 13 for the mounting of the end sections 21 and 22. Screws 19A pass through the flange portion 19 into the cylinder block 11. The details of the mounting of the end sections 21 and 22 to the middle housing section 13 are described in more detail in the above mentioned copending application.

In the embodiment shown in FIGS. 1 and 2, the end section 21 has a shoulder against which the flange portion 18 of the pipe section 16 rests. Screws 18C secure the flange 18 to the mounting ring end section 21. The right-hand end portion 17 of the exhaust gas pipe section 14 is provided with a guide pin 34 having a threaded hole for connection to a guide block 36 slidingly received in a guide bore 33 in the end section 22. A screw 34A reaches into the threaded hole in the guide pin 34 to secure the guide pin 34 to the guide block 36. Thus, in operation, any thermal expansions and contracts of the pipe section 14 in the axial direction are easily compensated. The guide block or bushing 36 improves the sliding characteristics relative to the guide bore 33, since the surface area in sliding contact may be increased by properly selecting the diameter of the guide bushing or block 36. By properly selecting this diameter of the block 36 with due regard to the operating temperature, it is possible to keep any radial play within acceptable limits.

As shown in FIG. 1, the exhaust gas pipe section 14 may be welded together by using three separate components, namely the uninterrupted central pipe section 16, the end cover 17, and the flange portion 18. However, the pipe section 14 may also be constructed as an integral one piece component for example by casting.

In FIG. 1, the mounting of the pipe section 14 in the cooling housing 12A is such that the right-hand end is free to perform an axial movement in response to a thermal expansion or contraction.

In the second embodiment shown in FIG. 3, the right-hand end closure member 29 of the pipe section 27 is rigidly mounted against a shoulder 31 of the cover section 26 by a screw 32A engaging a threaded hole 32 in the end portion 29. The left-hand end of the pipe section 27 is mounted in the end housing section 25 at least for a movement. Thus, the compensation with regard to axial expansions and contractions is the same as in the embodiment of FIG. 1. However, in FIG. 3, a compensation of radial expansions and contractions is also provided by an elastic ring 37 which is made of a heat resistant steel. The ring 37 simultaneously forms a guide ring for any axial movement of the pipe section 27.

As in FIG. 1, the pipe section 27 may be constructed either as a single piece, for example, cast component, or it may be formed of two separate components, namely the end cover portion 29 and a straight pipe section 28 which are welded to each other at 28A.

As best seen in FIG. 2, the rim or edge 30 of the passages for the exhaust gas into the pipe section 27 is thickened to form a beaded rim 35 which counteracts any tendency of the rim around the passages 20, 30 to tear during operation if the pipe section should be exposed to bending loads.

The end housing sections 21 and 22 in FIG. 1 and 25 and 26 in FIG. 3, are made as cast components, preferably of heavy metal, grey cast iron, whereby the tendency of fretting corrosion relative to the exhaust pipe section 14, 27, is further reduced.

According to the invention, it is possible to make the central or longitudinal housing section 13 of a light metal, preferably as an extruded component, because the exhaust gas pipe section is closed at one end, whereby the cooling housing is substantially protected against contact with the exhaust gas.

Although the invention has been described with reference to specific example embodiments it will be appreciated that it is intended to cover all modifications and equivalents within the scope of the appended claims.

What I claim is:

1. An exhaust gas duct for a row of cylinders of an internal combustion engine, comprising a single piece exhaust gas pipe section for extending alongside said row of cylinders, said exhaust pipe section having a first open end and a second closed end, a cooling housing wherein said exhaust gas pipe section is mounted, an insulating gap between said cooling housing and said pipe section, said cooling housing comprising an elongated housing section and first and second housing end sections for closing said elongated housing section, cooling liquid flow channels (15) in said cooling housing, exhaust gas flow passages (20) through said exhaust gas pipe section and through said cooling housing, said exhaust gas pipe section being self-supporting between its ends for mounting said ends of said exhaust gas pipe section in said housing end sections, whereby said exhaust gas pipe section is unsupported between its ends along said insulating gap, first means for mounting said first end of said exhaust gas pipe section in said first housing end section, and second means for mounting said second end of said exhaust gas pipe section in said second housing end section, at least one of said first and second mounting means permitting an axial displacement of said exhaust gas pipe section relative to said cooling housing in response to thermal expansions and contractions of said exhaust gas pipe section.

2. The exhaust gas duct of claim 1, wherein said first means for mounting comprise a shoulder in said first housing end section, a radially outwardly extending flange (18) at said first open end of said exhaust pipe section resting against said shoulder, and screws for securing said flange (18) to said first housing end section (21).

3. The exhaust gas duct of claim 2, wherein said second means for mounting comprise a guide bore in said second housing end section and a guide pin (34) secured to said second closed end of said exhaust pipe section, said guide pin (34) being guided in said guide bore (33) for permitting an axial displacement of said exhaust gas pipe section in said cooling housing.

4. The exhaust gas duct of claim 2, wherein said second means for mounting comprise a guide bore in said second housing end section, a guide block (36) slidable in said guide bore (33), and means (34, 34A) for securing said second closed end (17) of said exhaust gas pipe section (14) to said guide block, whereby said exhaust gas pipe section is axially displaceable in said cooling housing.

5. The exhaust gas duct of claim 1, wherein said first means for mounting comprise a guide bore (25A) through said first housing end section (25) said first open end of said exhaust gas pipe section comprising an outer diameter slidingly guided in said guide bore (25A) for said axial displacement.

6. The exhaust gas duct of claim 5, further comprising a guide ring (37) between said guide bore (25A) and said outer diameter of said exhaust gas pipe section (27), said guide ring being made made of elastic, heat resistant material.

7. The exhaust gas duct of claim 5, wherein said second means for mounting comprise a threaded hole in said second closed end of said exhaust pipe section, a through-bore in said second housing end section, and a screw (32A) engaging said threaded hole for securing said second closed end of said exhaust pipe section to said second housing end section (26).

8. The exhaust gas duct of claim 1, wherein said exhaust gas flow passages (30) through said exhaust gas pipe section have a beaded rim (35).

9. The exhaust gas duct of claim 1, wherein said elongated housing section of said cooling housing is an extruded profile section of a light metal.

10. The exhaust gas duct of claim 1, wherein said first and second housing end sections are cast pieces of heavy metal.

11. The exhaust gas duct of claim 1, wherein said exhaust gas pipe section comprises at least an elongated portion (27) and a closure portion (29), and a welding seam (27A) between said elongated portion and said closure portion.

12. The exhaust gas duct of claim 11, wherein said exhaust gas pipe section further comprises a flange open end portion (18) and a further welding seam (18B) between said flange open end portion and said elongated portion.

13. The exhaust gas duct of claim 1, further comprising means for mounting said cooling housing to a cylinder block of said engine.

* * * * *

UNITED STATES PATENT AND TRADEMARK OFFICE
CERTIFICATE OF CORRECTION

PATENT NO. : 5,305,603
DATED : April 26, 1994
INVENTOR(S) : Hermann Baumann

It is certified that error appears in the above-indentified patent and that said Letters Patent is hereby corrected as shown below:

Column 3, line 56, replace "contracts" by --contractions--;
Column 4, line 13, replace "a" by --axial--;
Column 5, line 32, after "(25)" insert --,--.

Signed and Sealed this

Second Day of August, 1994

Attest:

BRUCE LEHMAN

*Attesting Officer*    Commissioner of Patents and Trademarks